Nov. 15, 1960   P. P. LOVE ET AL   2,960,370
PLAIN BEARINGS

Filed July 24, 1959   3 Sheets-Sheet 1

INVENTORS
PHIL P. LOVE
MICHAEL J. NEALE

BY
Pierce, Scheffler & Parker
their ATTORNEYS

INVENTORS
PHIL P. LOVE
MICHAEL J. NEALE

United States Patent Office 2,960,370
Patented Nov. 15, 1960

2,960,370

PLAIN BEARINGS

Phil Prince Love and Michael John Neale, Wembley, England, assignors to The Glacier Metal Company Limited, Wembley, England, a company of Great Britain Filed July 24, 1959, Ser. No. 829,385

Claims priority, application Great Britain Aug. 5, 1958

19 Claims. (Cl. 308—121)

This invention relates to plain bearings of the self-aligning type comprising a journal member having an annular bearing surface of substantially spherical form, and a bearing member surrounding and supporting the journal member and similarly having an annular part-spherical bearing surface.

It is an object of the invention to provide an improved bearing of the kind referred to with effective means for lubricating the bearing surfaces.

To this end a bearing assembly according to the present invention comprises a journal member having an annular bearing surface of substantially spherical form and a bearing member surrounding and supporting the journal member and having an annular part-spherical bearing surface wherein there are provided in the bearing member two annular grooves (hereinafter for convenience called oil distributing grooves) disposed on opposite sides of and lying in planes parallel to the central plane normal to the axis of the bearing member, such oil distributing grooves being in communication with a lubricating oil supply.

The reference to the axis of the bearing member herein is to be understood as meaning the axis of the bearing surface regarded as an annulus, that is to say the axis about which the journal member would rotate if there is no lack of alignment between the journal member and the bearing member.

In one preferred arrangement according to the invention the bearing member is provided with a further annular groove, (hereinafter called for convenience the oil feed groove) lying approximately in the central transverse plane of the bearing member and communicating with an oil reservoir in which oil can be maintained at a level such that the journal member during rotation will lift oil up the oil feed groove by viscous drag, and catchment grooves are provided in the bearing member at a level substantially at or above the axis of the journal member to receive oil thus lifted and spread it across the journal surfaces to the oil distributing grooves referred to above. Moreover in such an arrangement the oil feed groove is preferably reduced in depth adjacent to the point at which it communicates with the catchment grooves so as to impart inertia pressure to the oil where it enters either catchment groove and thus urge the oil to spread along such groove.

In such case the reduction in depth of the oil feed groove is conveniently at least half the depth of the catchment groove or each catchment groove.

If the bearing is destined for rotation in one direction only a single catchment groove may be sufficient but that where the bearing is designed and intended for rotation in either direction two catchment grooves arranged to receive the oil lifted by viscous drag respectively for the two directions of rotation of the bearing will be required. Moreover in general it may be preferred always to provide two such catchment grooves so that the bearing will be suitable for rotation in either direction even if destined for rotation in one direction only.

The arrangement of the catchment groove or catchment grooves may vary, but in one convenient arrangement the catchment groove or each catchment groove is formed between the joint faces of upper and lower parts comprising the bearing member.

As an alternative to the above-described arrangement, instead of the oil feed groove a cavity is provided between the bearing surfaces of the journal member and the bearing member in approximately the central plane of the bearing, such cavity communicating with the reservoir or other source of oil at low pressure so that oil is carried up from the cavity over the bearing surfaces by viscous drag, enters the catchment grooves and flows along them to the oil distributing grooves, whence it tends to return over the bearing surfaces to the cavity. Moreover the cavity is preferably situated in a region lying at about 45° to the line of action of the average radial load.

According to a further feature of the invention the bearing member and the journal are provided with pairs of co-operating annular sealing surfaces disposed respectively on the sides of the oil distributing grooves remote from the central plane so as to limit or prevent the escape of oil at the ends of the bearing assembly. Moreover the pairs of co-operating sealing surfaces may be separated from the main bearing surface by annular oil catching chambers subject to low pressure, such chambers for example communicating with an oil sump in the bearing assembly. Each of the annular oil catching chambers is further preferably formed by co-operating grooves respectively in the bearing member and in the journal with the outer edge of each groove in the journal lying within the associated groove in the bearing member so as to act as a "slinger" tending to prevent oil reaching the sealing surfaces, to which end the outer edge referred to is preferably made sharp.

One construction according to the invention and a modification thereof are shown by way of example in the accompanying drawings, in which Figure 1 is a cross section of one construction in a vertical plane containing the axis of the bearing member, Figure 2 is a plan view of Figure 1 with the top half of the bearing member removed, Figure 3 is a cross section on the chain line III—III of Figure 1.

Figure 1:
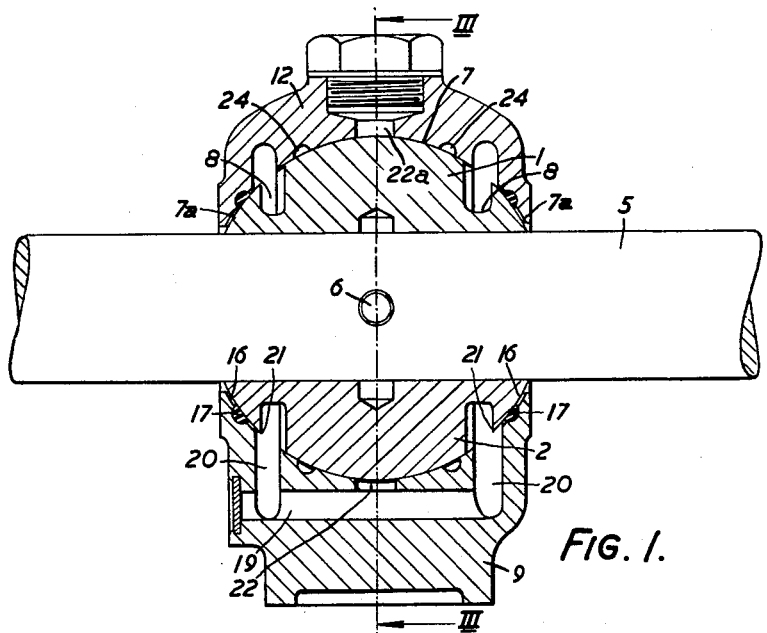

In the construction shown in Figures 1 to 5 the bearing assembly is of the pedestal type and comprises a journal member formed in two semi-annular parts 1 and 2 rigidly connected together by bolts 3 surrounded by tubular locating dowels 4 as shown, the two parts being arranged either directly or by means of one or more "tolerance strips" or the equivalent to grip firmly a shaft 5 about which they are clamped. In addition, to ensure that the journal member 1, 2, rotates with the shaft 5 one or more dowels may be provided extending into appropriate recesses respectively in the shaft and the journal member 1, 2, as indicated at 6. Such dowels might be formed for example of nylon or other suitable plastic as might be the tolerance strip or strips when provided. Alternatively or in addition the bore of the journal member 1, 2 might be serrated for the purpose of increasing its grip above the shaft 5 and/or assisting in ensuring that it will do so when the two halves of the journal member abut correctly at their joint faces, in spite of manufacturing tolerances. The journal member has an annular part-spherical surface of which the central part 7 constitutes its main bearing surface, this central part being separated by two parallel annular grooves 8 from annular end parts 7a of the surface which in a manner hereinafter more fully described constitutes sealing surfaces.

Figure 2:
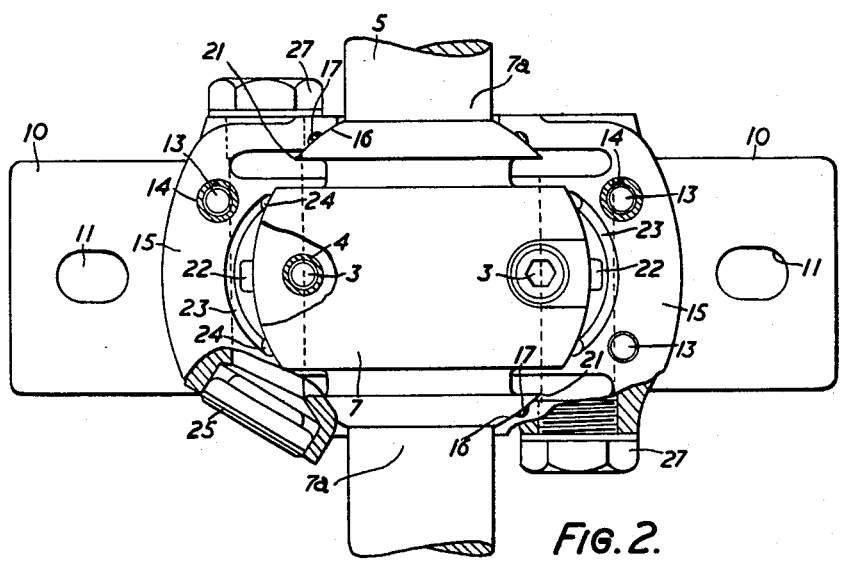
Figure 3:
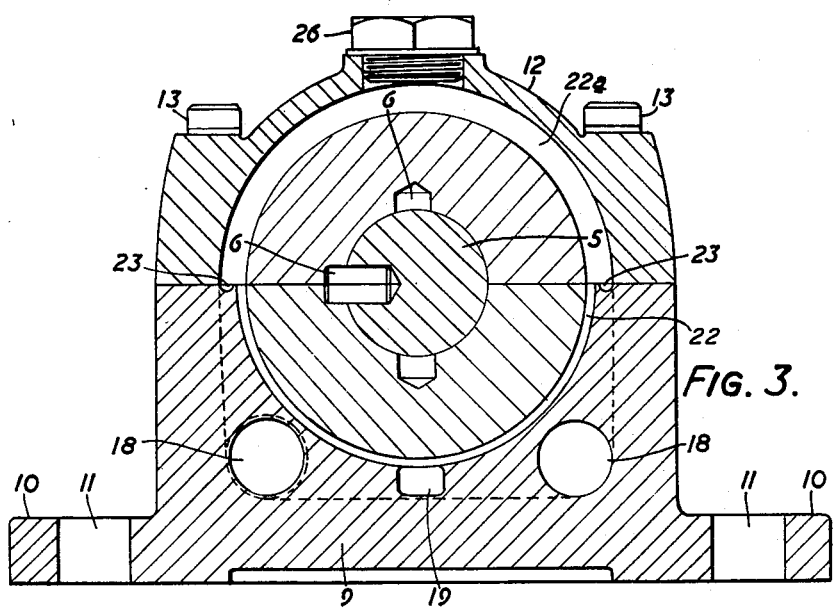
Figure 4:
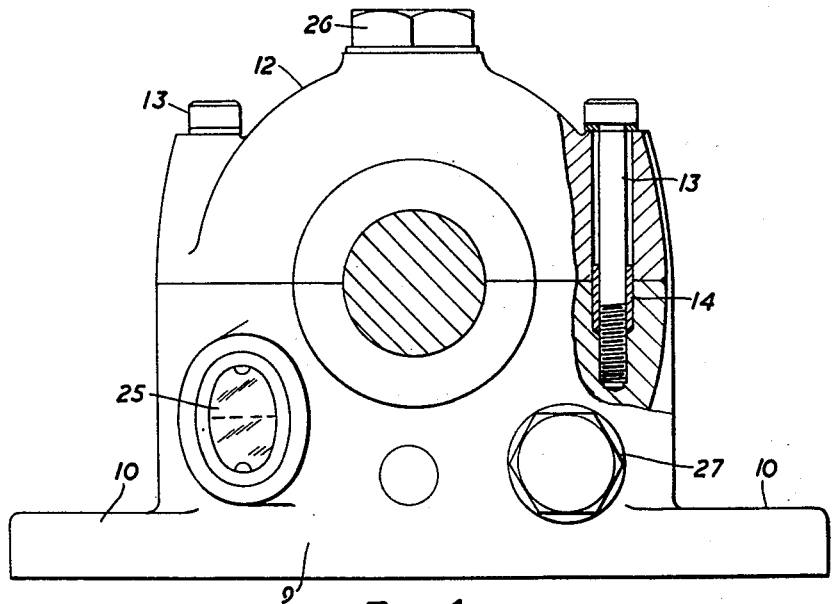
Figure 4 is an end view of the bearing shown in Figure 1 partly in section.
Figure 5:
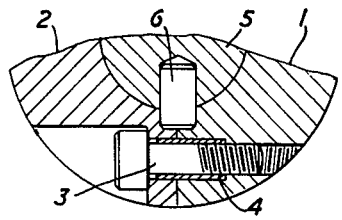
Figure 5 is a cross section showing certain details of the journal member of the bearing shown in Figure 1.

Surrounding and supporting the journal member is a pedestal type bearing member comprising a lower part or base 9 having flanges and bolt holes 10, 11 whereby it can be rigidly mounted in a fixed position, and an upper part or strap 12 which can be rigidly clamped to the lower part 9 by bolts 13 surrounded by tubular locating dowels 14. The two parts 9 and 12 of the bearing member abut at faces one of which is shown at 15 in Figure 2. As will be seen the upper and lower parts 9 and 12 of the bearing member have internal part-spherical bearing surfaces which co-operate with the part 7 of the bearing surface of the journal member 1, 2 and also have sealing areas 16 which co-operate with the sealing surfaces 7a for which purpose there may be provided in each of the sealing areas 16 a groove containing flexible sealing rings 17 as shown in Figures 1 and 2.

The lower part 9 of the bearing member is formed to provide a sump which includes two longitudinally extending chambers 18 and a trough-like passage 19 the ends of which chambers and trough-like passage communicate with one another by way of the lower parts of annular grooves 20 communicating with and approximately surrounding the grooves 8 in the journal member to form annular chambers. As will be seen the central plane of each of the grooves 8 is slightly displaced from the central plane of its co-operating groove 20 in such manner that the outer edge 21 of each of the grooves 8 lies within the associated groove 20. This edge is moreover made sharp so as to act as a "slinger."

The centre of the trough 19 communicates with an annular groove having a lower part 22 formed in the base 9 and an upper part 22a (of greater radial depth than the lower part 22) formed in the strap 12, the groove constituting an oil feed groove up which when the sump referred to contains an appropriate quantity of oil the journal member during rotation will raise oil from such sump by viscous drag. Formed in the faces of the part 9 of the bearing member are catchment grooves indicated at 23 communicating with the upper part 22a of the oil feed groove so that, whichever the direction of rotation of the journal member, the oil raised up the groove 22 by viscous drag in the manner referred to above will be discharged into one or other of the catchment grooves 23. The outer ends of the catchment grooves 23 communicate with oil distributing grooves 24 in the bearing member situated between the central plane and the grooves 20 so that the catchment grooves serve to distribute oil to the grooves 24, from which the oil then tends to flow over the bearing surfaces both back towards the oil feed groove 22 and 22a and also outwards into the chambers 20, 8 which thereby constitute oil catching chambers situated between the oil distributing grooves 24 and the pairs of cooperating sealing surfaces 7a, 16.

The lower part 22 of the oil feed groove is of smaller radial depth than the upper part 22a thereof so as to produce inertia pressure in the oil where it enters the catchment groove.

A "window" 25 is provided at an appropriate point in the sump constituted by the chambers and passage 18, 19 so that the oil level in the sump can be observed, while a filling plug 26 is provided at the top of the bearing and drain plugs 27 at one end of each of the chambers 18.

In some cases the co-operating sealing surfaces 7a and 16 may be concentric with but of larger radius than the main parts 7 of the bearing surfaces lying between the grooves 8, 20.

Figure 6:
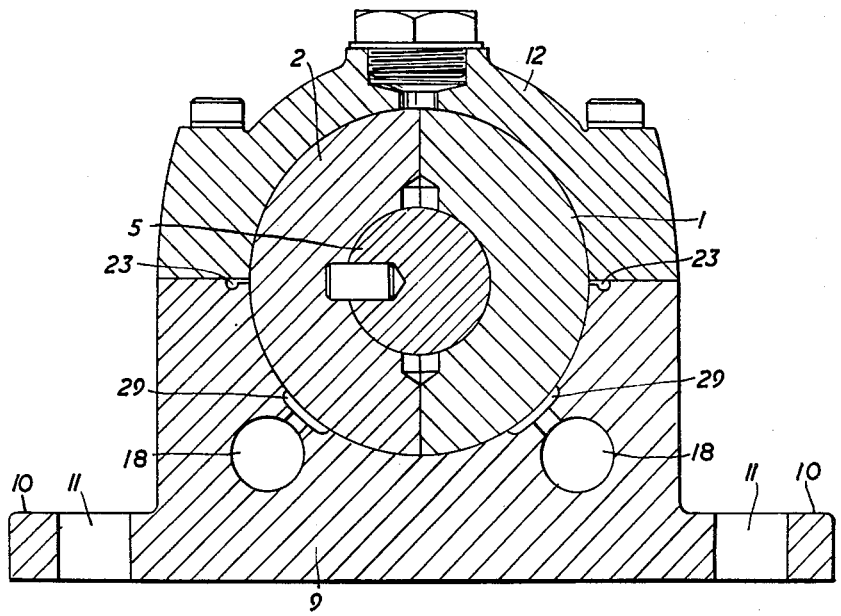
Figure 6 is a cross section showing a modification, the cross section being taken in the central transverse plane of the bearing.

In the modification shown in Figure 6 the construction is generally similar to that shown in Figures 1 to 5 and corresponding parts have been given the same reference numerals and will not again be described.

In the construction shown in Figure 6 the passage 19 and the oil feed groove 22 are omitted and instead a cavity 29 is provided communicating with one at least of the chambers 18 and situated at a point lying at about 45° to the line of action of the average radial load. If the journal is to rotate in either direction two such cavities will be provided as shown.

In operation the journal carries oil upwards by viscous drag along the bearing surface from the cavity on the downstream side of the line of action referred to and feeds it into the adjacent catchment groove 23 from which it flows to the oil distributing grooves 24.

What we claim as our invention and desire to secure by Letters Patent is:

1. A plain bearing assembly comprising a journal member having an annular bearing surface of substantially spherical form and a bearing member surrounding and supporting said journal member, said bearing member having two annular oil distributing grooves disposed on opposite sides of and lying in planes parallel to the central plane normal to the axis of said bearing member, means for delivering oil to said oil distributing grooves, an oil sump in the bearing member, a central annular oil-feed groove formed in the bearing member extending around at least a part of the circumference of the journal member and communicating at a lower level with said sump, whereby the journal member will carry oil up said oil feed groove by viscous drag, and at least one catchment passage, leading from said oil feed groove at a higher level to the annular oil distributing grooves.

2. A plain bearing assembly as claimed in claim 1 in which the catchment passage extends between the oil feed groove and the annular oil distributing grooves at a level not lower than the axis of the bearing.

3. A plain bearing assembly as claimed in claim 2 in which the oil feed groove is reduced in depth adjacent to the point where it communicates with the catchment passage by momentum action and thus urge the oil to spread along such catchment passage.

4. A plain bearing assembly as claimed in claim 3 in which reduction in depth of the oil feed groove is the equivalent to a reduction of at least half the cross section of the catchment passage.

5. A plain bearing assembly as claimed in claim 2 in which the bearing member comprises upper and lower semi-annular parts abutting against one another at joint faces and in which the catchment passage is formed by a groove between said joint faces.

6. A plain bearing assembly as claimed in claim 5 in which the oil feed groove is reduced in depth adjacent to the point where it communicates with the groove constituting the catchment passage.

7. A plain bearing assembly comprising a journal member having an annular bearing surface of substantially spherical form and a bearing member surrounding and supporting said journal member, said bearing member having two annular oil distributing grooves disposed on opposite sides of and lying in planes parallel to the central plane normal to the axis of said bearing member, means for delivering oil to said oil distributing grooves, including pairs of co-operating annular sealing surfaces disposed on the sides of the oil distributing grooves remote from the central plane, one of the surfaces of each pair being formed on the journal member and the other on the bearing member.

8. A plain bearing assembly as claimed in claim 7 in which each pair of co-operating sealing surfaces is separated from the main bearing surfaces by an annular chamber communicating with a space at low pressure.

9. A plain bearing assembly as claimed in claim 8 in which each of the annular chambers is formed by co-operating annular grooves respectively in the bearing member and in the journal and wherein the outer edge of the groove in the journal lies within the groove in the bearing member to serve as a slinger.

10. A plain bearing assembly comprising a housing constituting a bearing member and comprising upper and lower parts formed to provide between them an annular bearing surface of spherical form, the lower part of the housing being formed to provide an oil reservoir having an aperture opening through said annular bearing surface adjacent to the central transverse plane thereof while a circumferentially extending groove constituting an oil feed groove is formed in said annular bearing surface and extends upwards of such surface from said aperture, annular oil distributing grooves also being formed in said annular bearing surface and lying in planes spaced from and parallel to the plane in which said oil feed groove lies, at least one catchment passage extending between the upper end of said oil feed groove and said oil distributing grooves and a journal member lying and supported within said housing and having an annular bearing surface of spherical form co-operating with the annular bearing surface of the said bearing member and serving during operation to lift oil by viscous drag from said aperture to said catchment passage.

11. A plain bearing assembly as claimed in claim 10 in which annular oil catching chambers are formed between the bearing member and the journal member, said oil catching chambers lying in planes normal to the axis of the bearing and being displaced outwardly from the said oil distributing grooves and communicating with the said sump.

12. A plain bearing assembly as claimed in claim 11 wherein there are provided respectively on the bearing member and the journal member pairs of co-operating annular part-spherical sealing surfaces displaced axially outwards from said oil catching chambers, to limit escape of oil from said chambers at the ends of the bearing assembly.

13. A plain bearing assembly as claimed in claim 12 wherein said co-operating pairs of sealing surfaces are concentric with the bearing surfaces but have radii of curvature larger than those of the bearing surfaces.

14. A plain bearing assembly as claimed in claim 13 in which one of the sealing surfaces of each pair is constituted by a flexible sealing ring.

15. A plain bearing assembly comprising a journal member having an annular bearing surface of substantially spherical form and a bearing member surrounding and supporting said journal member, said bearing member having two annular oil distributing grooves disposed on opposite sides of and lying in planes parallel to the central plane normal to the axis of said bearing member, means for delivering oil to said oil distributing grooves, including a cavity formed between the bearing surfaces and approximately in the central plane of the bearing, said cavity communicating with a source of oil at low pressure.

16. A plain bearing assembly as claimed in claim 15 in which said cavity is displaced by approximately 45° from the line of action of the average radial load.

17. A plain bearing assembly as claimed in claim 16 including at least one catchment passage receiving oil raised by viscous drag from said cavity and delivering it to said oil distributing grooves.

18. A plain bearing assembly as claimed in claim 15 including at least one catchment passage receiving oil raised by viscous drag from said cavity and delivering it to said oil distributing grooves.

19. A plain bearing assembly as claimed in claim 17 in which the bearing member comprises upper and lower semi-annular parts abutting against one another at joint faces and in which the catchment passage is formed by a groove between said joint faces.

References Cited in the file of this patent

UNITED STATES PATENTS 1,300,023     Riegel _____ Apr. 8, 1919

UNITED STATES PATENT OFFICE
CERTIFICATE OF CORRECTION

Patent No. 2,960,370                      November 15, 1960

Phil Prince Love et al.

It is hereby certified that error appears in the printed specification of the above numbered patent requiring correction and that the said Letters Patent should read as corrected below.

Column 4, line 41, after "passage" insert -- to produce pressure in the oil where it enters the catchment passage --.

Signed and sealed this 25th day of April 1961.

(SEAL)
Attest:

ERNEST W. SWIDER
Attesting Officer

DAVID L. LADD
Commissioner of Patents